United States Patent
Bergman et al.

(10) Patent No.: US 9,900,851 B2
(45) Date of Patent: *Feb. 20, 2018

(54) METHODS AND APPARATUSES FOR TRANSMISSION POWER CONTROL

(71) Applicant: Telefonaktiebolaget L M Ericsson (publ), Stockholm (SE)

(72) Inventors: Johan Bergman, Stockholm (SE); Johan Hultell, Solna (SE); Jinhua Liu, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 401 days.

This patent is subject to a terminal disclaimer.

(21) Appl. No.: 14/492,502

(22) Filed: Sep. 22, 2014

(65) Prior Publication Data

US 2015/0043498 A1    Feb. 12, 2015

Related U.S. Application Data

(63) Continuation of application No. 13/378,293, filed as application No. PCT/SE2011/051456 on Nov. 30, 2011, now Pat. No. 8,880,114.

(Continued)

(51) Int. Cl.
*H04W 52/36* (2009.01)
*H04B 7/0404* (2017.01)
(Continued)

(52) U.S. Cl.
CPC .......... *H04W 52/36* (2013.01); *H04B 7/0404* (2013.01); *H04B 7/0413* (2013.01);
(Continued)

(58) Field of Classification Search
None
See application file for complete search history.

(56) References Cited

U.S. PATENT DOCUMENTS

| | | | | |
|---|---|---|---|---|
| 8,514,794 B2* | 8/2013 | Zhang | ................. | H04W 52/346 370/329 |
| 8,724,555 B2* | 5/2014 | Krishnan | .............. | H04L 5/0023 370/208 |

(Continued)

FOREIGN PATENT DOCUMENTS

| | | |
|---|---|---|
| WO | 2010068153 A1 | 6/2010 |
| WO | 2012064778 A1 | 5/2012 |

OTHER PUBLICATIONS

3GPP, "3GPP TR 25.863, V10.0.0 (Jul. 2010)", 3rd Generation Partnership Project; Technical Specification Group Radio Access Network; Universal Terrestrial Radio Access (UTRA); Uplink transmit diversity for High Speed Packet Access (HSPA) (Release 10). Jul. 2010.

(Continued)

*Primary Examiner* — Donald Mills
(74) *Attorney, Agent, or Firm* — Murphy, Bilak & Homiller, PLLC

(57) ABSTRACT

Methods and apparatuses that facilitate power and quality control of uplink MIMO transmissions. A method in a NodeB comprises controlling transmission power of multiple pilot signals transmitted by a user equipment by using a single inner power control loop operating on at least one pilot signal of the multiple pilot signals. Some disclosed embodiments also relate to adjustment of a quality target applied by the single inner power control loop and to updating of a power offset for computing the number of bits that the user equipment can transmit on a stream that is (Continued)

associated with a pilot signal that is not power controlled by the single inner power control loop.

8 Claims, 7 Drawing Sheets

Related U.S. Application Data

(60) Provisional application No. 61/426,036, filed on Dec. 22, 2010.

(51) Int. Cl.
| | |
|---|---|
| *H04W 52/12* | (2009.01) |
| *H04W 52/14* | (2009.01) |
| *H04W 52/16* | (2009.01) |
| *H04W 52/42* | (2009.01) |
| *H04B 7/0413* | (2017.01) |
| *H04L 5/00* | (2006.01) |
| *H04W 52/32* | (2009.01) |

(52) U.S. Cl.
CPC .......... *H04L 5/0048* (2013.01); *H04W 52/12* (2013.01); *H04W 52/146* (2013.01); *H04W 52/16* (2013.01); *H04W 52/42* (2013.01); *H04W 52/325* (2013.01)

(56) References Cited

U.S. PATENT DOCUMENTS

| 8,880,114 | B2* | 11/2014 | Bergman | H04B 7/0404 |
|---|---|---|---|---|
| | | | | 455/127.1 |
| 2003/0064743 | A1 | 4/2003 | Chen | |
| 2004/0246924 | A1 | 12/2004 | Lundby et al. | |
| 2010/0041429 | A1* | 2/2010 | Sidi | H04B 7/022 |
| | | | | 455/522 |
| 2010/0238825 | A1 | 9/2010 | Zhang et al. | |
| 2011/0222455 | A1* | 9/2011 | Hou | H04W 52/267 |
| | | | | 370/311 |
| 2012/0082192 | A1* | 4/2012 | Pelletier | H04W 52/42 |
| | | | | 375/219 |
| 2012/0281642 | A1* | 11/2012 | Sambhwani | H04W 52/325 |
| | | | | 370/329 |

OTHER PUBLICATIONS

3GPP, "3GPP TS 25.321, V8.6.0 (Jun. 2009)", 3rd Generation Partnership Project; Technical Specification Group Radio Access Network; Medium Access Control (MAC) protocol specification (Release 8). Jun. 2009.

3GPP, "3GPP TS 25.321, V9.0.0 (Sep. 2009)", 3rd Generation Partnership Project; Technical Specification Group Radio Access Network; Medium Access Control (MAC) protocol specification (Release 9). Sep. 2009.

Unknown, Author, "New WI Proposal: Uplink Transmit Diveristy for HSPA—Closed Loop Core Part", 3GPP TSG-RAN Meeting #50, RP-101438, Istanbul, Turkey, Dec. 7-10, 2010.

Unknown, Author, "New WI Proposal: Uplink Transmit Diveristy for HSPA—Closed Loop Performance Part", 3GPP TSG-RAN Meeting #50, RP-101438, Istanbul, Turkey, Dec. 7-10, 2010.

Unknown, Author, "New WI Proposal: Uplink Transmit Diveristy for HSPA—Open Loop Core Part", 3GPP TSG-RAN Meeting #50, RP-101438, Istanbul, Turkey, Dec. 7-10, 2010.

Unknown, Author, "New WI Proposal: Uplink Transmit Diveristy for HSPA—Open Loop Performance Part", 3GPP TSG-RAN Meeting #50, RP-101438, Istanbul, Turkey, Dec. 7-10, 2010.

Unknown, Author, "On the benefits of Uplink Closed Loop Transmit Diversity", 3GPP TSG-RAN WG1 Meeting #62, R1-104737, Madrid, Spain, Aug. 23-27, 2010.

Unknown, Author , "SI Proposal for Uplink MIMO", 3GPP TSG-RAN Meeting #50, RP-101432, Istanbul, Turkey, Dec. 7-10, 2010, 1-5.

Unknown, Author, "UL SU-MIMO Power Control", 3GPP TSG-RAN WG1 Meeting #60bis, R1-102182, Beijing, China, Apr. 12-16, 2010.

Unknown, Author, "Uplink Power Control for Multi-antenna Transmission", 3GPP TSG-RAN WG1 Meeting #60bis, R1-102294, Beijing, China, Apr. 12-16, 2010.

\* cited by examiner

METHODS AND APPARATUSES FOR TRANSMISSION POWER CONTROL

RELATED APPLICATIONS

This application is a continuation of co-pending U.S. patent application Ser. No. 13/378,293, filed 14 Dec. 2011, which is a national stage application for international patent application no. PCT/SE2011/051456, filed 30 Nov. 2011, which claims priority to U.S. provisional application No. 61/426,036, filed 22 Dec. 2010. The entire contents of each of the aforementioned applications are incorporated herein by reference.

TECHNICAL FIELD

The embodiments described herein relate to transmission power control in a communications system and in particular to transmission power control of uplink Multiple-Input Multiple-Output, MIMO transmissions.

BACKGROUND

There is a continuous development of new generations of mobile communications technologies to cope with increasing requirements of higher data rates, improved efficiency and lower costs. High Speed Downlink Packet Access (HSDPA) and High Speed Uplink Packet Access (HSUPA), together referred to as High Speed Packet Access (HSPA), are mobile communication protocols that were developed to cope with higher data rates than original Wideband Code Division Multiple Access (WCDMA) protocols were capable of. The 3rd Generation Partnership Project (3GPP) is a standards-developing organization that is continuing its work of evolving HSPA and creating new standards that allow for even higher data rates and improved functionality.

In a radio access network implementing HSPA, a user equipment (UE) is wirelessly connected to a radio base station (RBS) commonly referred to as a NodeB (NB). A radio base station is a general term for a radio network node capable of transmitting radio signals to a user equipment (UE) and receiving signals transmitted by a user equipment (UE).

3GPP has evaluated the potential benefits of uplink transmit (Tx) diversity in the context of HSUPA. With uplink transmit diversity, UEs that are equipped with two or more transmit antennas are capable of utilizing all of them for uplink transmissions. This is achieved by multiplying a UE output signal with a set of complex pre-coding weights, a so-called pre-coding vector with one pre-coding weight for each physical transmit antenna. The rationale behind uplink transmit diversity is to adapt the pre-coding weights so that user and network performance is maximized. Depending on UE implementation the antenna weights may be associated with different constraints. Within 3GPP two classes of transmit diversity are considered:

Switched antenna transmit diversity, where the UE at any given time-instance transmits from one of its antennas only.

Beamforming where the UE at a given time-instance can transmit from more than one antenna simultaneously. By means of beamforming it is possible to shape an overall antenna beam in the direction of a target receiver.

While switched antenna transmit diversity is possible for UE implementations with a single power amplifier (PA), the beam forming solutions may require one PA for each transmit antenna.

Switched antenna transmit diversity can be seen as a special case of beamforming where one of the antenna weights is 1 (i.e., switched on) and the antenna weight of any other antenna of the UE is 0 (i.e., switched off).

A fundamental idea behind uplink transmit diversity is to exploit variations in the effective channel to improve user and network performance. The term effective channel here incorporates effects of transmit antenna(s), transmit antenna weights, receiving antenna(s), as well as the wireless channel between transmitting and receiving antennas. Selection of appropriate antenna weights is crucial in order to be able to exploit the variations in the effective channel constructively.

During 2009 and 2010 the 3GPP evaluated the merits of open loop beam forming and open loop antenna switching for uplink transmissions in WCDMA/HSPA. These techniques are based on that UEs equipped with multiple transmit antennas exploit existing feedback e.g. feedback transmitted on the Fractional Dedicated Physical Channel (F-DPCH) or on the E-DCH HARQ Acknowledgement Indicator Channel (E-HICH) to determine a suitable pre-coding vector in an autonomous fashion. The purpose of pre-coding the signals is to "maximize" the signal to interference ratio (SIR) at the receiving NodeB. Since the network is unaware of the applied pre-coding weights the NodeBs will experience a discontinuity in the measured power whenever a change in pre-coding weights occurs. A summary of the 3GPP studies on open loop transmit diversity techniques can be found in 3GPP's technical report TR 25.863, UTRA: Uplink Transmit Diversity for High Speed Packet Access.

Recently there have been proposals for introducing closed loop transmit diversity for WCDMA/HSPA. Closed loop transmit diversity refers to both closed loop beam forming and closed loop antenna switching. At the 3GPP meeting RAN#50 a work item with the purpose of specifying support for closed loop transmit diversity was agreed. Contrary to the open loop techniques where the UE decides pre-coding weights autonomously, closed loop techniques are based on that the network, e.g., the serving NodeB, selects the pre-coding vector with which the signal is multiplied. In order to signal the necessary feedback information from the network to the UE, the NodeB can either rely on one of the existing physical channels, e.g., F-DPCH, or a new feedback channel could be introduced.

Uplink multiple-input-multiple-output (MIMO) transmission is another related technique that has been proposed as a candidate for WCDMA/HSPA in 3GPP standard release 11. A study item on uplink MIMO for WCDMA/HSUPA was started at the 3GPP RAN#50 plenary meeting. For uplink MIMO, different data is transmitted from different virtual antennas in so-called streams, where each virtual antenna corresponds to a different pre-coding vector. Note that closed loop beam forming can be viewed as a special case of uplink MIMO where no data is scheduled on one of two virtual antennas.

MIMO technology is mainly beneficial in situations where the "composite channel" is strong and has high rank. The term composite channel includes the potential effects of transmit antenna(s), PAs, as well as the radio channel between the transmitting and receiving antennas. The rank of the composite channel depends on the number of uncorrelated paths between the transmitter and the receiver. Single-stream transmissions, i.e., beamforming techniques, are generally preferred over MIMO transmissions in situations where the rank of the composite channel is low e.g. where there is a limited amount of multi-path propagation and cross polarized antennas are not used, and/or the path gain between the UE and the NodeB is weak. This results from a combined effect of that the theoretical gains of MIMO transmissions is marginal at low SIR operating point and that inter-stream interference can be avoided in case of single-stream transmissions.

Currently HSUPA does not allow MIMO transmission since only single stream transmissions are allowed. Inner loop power control (ILPC) and outer loop power control (OLPC) are used to control the quality of the uplink transmission. More specifically, the ILPC is located in the NodeB(s) of an active set. The ILPC is used to ensure that a Dedicated Physical Control Channel (DPCCH) pilot quality target $\Gamma_{target}$ is maintained. All NodeB(s) in the active set monitor that the received power of the DPCCH pilot fulfills the quality target $\Gamma_{target}$ and based on this monitoring these NodeB(s) issue transmit power control (TPC) commands to the UE to raise or lower the transmission power of the DPCCH pilot. Since gain factors for a certain Enhanced Dedicated Channel Transmission Format Combination (E-TFC) are pre-defined power offsets with respect to the DPCCH transmit power, the ILPC implicitly controls the transmit power of all the physical channels. The OLPC is located in the radio network controller (RNC) and is used to control the quality target $\Gamma_{target}$ used by the ILPC. Although not specified in the 3GPP standard, the OLPC typically increases the quality target $\Gamma_{target}$ if a too high transport block error rate (BLER) is observed.

For uplink MIMO transmissions, the UE needs to transport multiple DPCCH pilots in order to estimate the wireless channel. For instance for 2×2 uplink MIMO, two DPCCHs need to be transmitted by the UE. Data signals associated with different streams and different pilot signals will generally experience different radio link quality. An issue for such settings then becomes power control to ensure reliability and efficiency of UL multiple stream transmissions.

SUMMARY

It is an object to provide methods and apparatuses for power control of uplink MIMO transmissions. This object may be achieved by means of methods, and apparatuses according to the independent claims.

A first embodiment provides a method in a NodeB configured for controlling transmission power of a user equipment configured for uplink MIMO transmissions. The method comprises controlling transmission power of multiple pilot signals transmitted by the user equipment. The transmission power of the multiple pilot signals is controlled by using a single inner power control loop operating on at least one pilot signal of the multiple pilot signals. The single inner power control loop comprises a step of generating transmit power control commands. Quality of the at least one pilot signal and a quality target are considered when generating the transmit power control commands. The single inner power control loop also comprises a step of transmitting, to the user equipment, the transmit power control commands to adjust the transmission power of the at least one pilot signal so that the quality of the at least one pilot signal meets the quality target.

A second embodiment provides a method in a user equipment configured for uplink MIMO transmissions. The method comprises transmitting multiple pilot signals. The method also comprises receiving, from a NodeB, transmit power control commands for adjusting the transmission power of a first pilot signal. The method further comprises adjusting the transmission power of the first pilot signal in accordance with the transmit power control commands while adjusting the transmission power of a second pilot signal so that a fixed power difference is maintained between the first pilot signal and the second pilot signal.

A third embodiment provides a NodeB configured for controlling transmission power of a user equipment configured for uplink MIMO transmissions. The NodeB comprises a processor and a transceiver configured to control transmission power of multiple pilot signals transmitted by the user equipment. The processor and transceiver are configured to control the transmission power of the multiple pilot signals by executing a single inner power control loop operating on at least one pilot signal of the multiple pilot signals. The single inner power control loop, when executed, comprises generating transmit power control commands. Quality of the at least one pilot signal and a quality target are considered when generating the transmit power control commands. The single inner power control loop also comprises transmission, to the user equipment, of the transmit power control commands to adjust the transmission power of the at least one pilot signal so that the quality of the at least one pilot signal meets the quality target.

A fourth embodiment provides a user equipment configured for uplink MIMO transmissions. The user equipment comprises a transceiver and a processor. The transceiver is configured to transmit multiple pilot signals and to receive, from a NodeB, transmit power control commands for adjusting the transmission power of a first pilot signal. The processor is configured to adjust the transmission power of the first pilot signal in accordance with the transmit power control commands while adjusting the transmission power of the second pilot signal so that a fixed power difference between the first pilot signal and the second pilot signal is maintained.

An advantage of some of the embodiments described herein is that multiple streams of uplink MIMO transmissions may be power controlled. Another advantage of some of the embodiments of this disclosure is that the network is provided a possibility to control quality of uplink MIMO transmissions. Yet another advantage of some of the embodiments of this disclosure is that power and quality control of different streams of uplink MIMO transmissions may be achieved without requiring any signaling from the UE to the NodeB of power offsets between different pilot signals for the purpose of channel estimation. By using a single inner loop power control (ILPC) to control quality for all streams and maintaining a fixed power offset between the pilot signals, there is no need to signal the power offset between the different pilot signals.

Further advantages and features of embodiments of the present invention will become apparent when reading the following detailed description in conjunction with the drawings.

DETAILED DESCRIPTION

Figure 1:
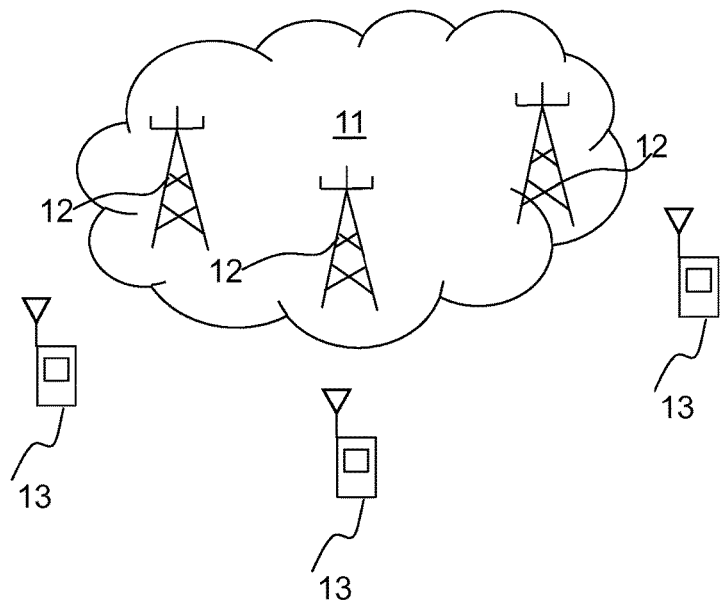
FIG. 1 is a schematic diagram illustrating a communication system in which different embodiments of this disclosure may be implemented.

The embodiments of this disclosure will now be described more fully hereinafter with reference to the accompanying drawings, in which different exemplary embodiments are shown. These exemplary embodiments are provided so that this disclosure will be thorough and complete and not for purposes of limitation. In the drawings, like reference signs refer to like elements.

Embodiments of this disclosure may be implemented in a network such as that illustrated in FIG. 1. As shown in FIG. 1, an example network 11 may include one or more instances of user equipments (UEs) 13 and one or more base stations 12 capable of communicating with the UEs 13, along with any additional elements suitable to support communication between UEs or between a UE and another communication device (such as a landline telephone). Although the illustrated UEs 13 may represent communication devices that include any suitable combination of hardware and/or software, these UEs may, in particular embodiments, represent devices such as the example UE illustrated in greater detail by FIG. 11. Similarly, although the illustrated base stations 12 may represent network nodes that include any suitable combination of hardware and/or software, these base stations may, in particular embodiments, represent devices such as the example base station 12 illustrated in greater detail by FIG. 10.

Figure 2:
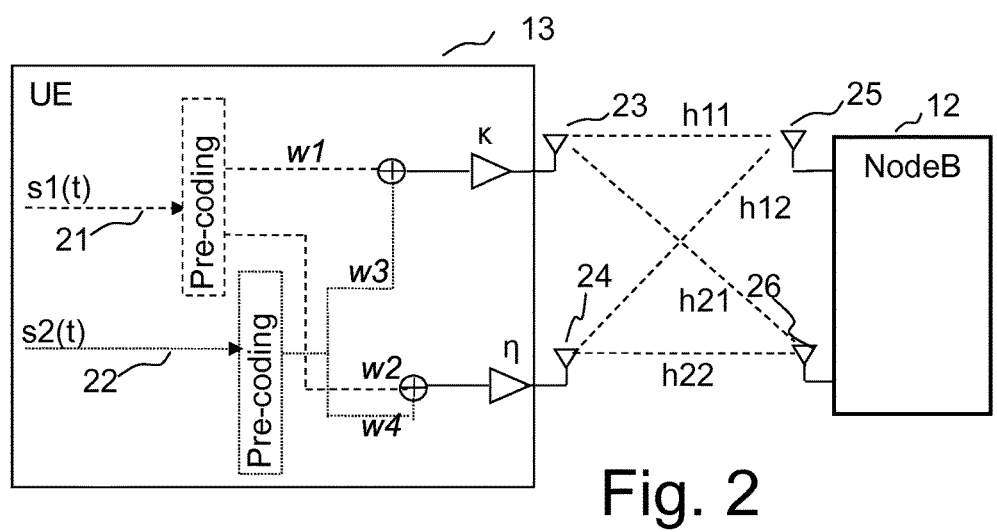
FIG. 2 is a schematic block diagram illustrating an embodiment of a communication system supporting uplink MIMO.

FIG. 2 is a schematic block diagram illustrating a system in which different embodiments of this disclosure may be implemented. FIG. 2 shows a UE 13 configured to support uplink MIMO transmissions for communication with a network node 12, which for instance may be a serving NodeB. The exemplary UE 13 is illustrated with two physical transmit antennas 23, 24 and the network node 12 is illustrated with two physical receive antennas 25, 26. The composite channel between the UE 13 and the network node 12 comprises wireless channels h11, h12, h21 and h22 between the different transmit antennas 23, 24 and receive antennas 25, 26 as illustrated in FIG. 2.

Using uplink MIMO, different data, such as a first signal s1(t) and a second signal s2(t) as illustrated in FIG. 2, are transmitted in different streams 21, 22. Here parts with dashed border are associated with a first stream 21 and parts with dotted borders are associated with a second stream 22. Signals associated with the first stream 21 are pre-coded with pre-coding weights w1 and w2 prior to transmission from the different physical antennas 23 and 24. Signals associated with the second stream 22 are pre-coded with pre-coding weights w3 and w4 prior to transmission from the different physical antennas 23 and 24.

For multi-antenna transmission techniques it is important that the network, e.g., a serving NodeB, has the ability to acquire knowledge about the wireless channels. This is because for a UE 13 configured in uplink MIMO mode, knowledge about the channel characteristics are needed both to determine the rank of the channel and to determine suitable pre-coding vector(s).

In the following we assume that the UE 13 transmits a primary pilot signal on a primary dedicated physical control channel (P-DPCCH) and a secondary pilot signal on a secondary dedicated physical control channel (S-DPCCH). The primary dedicated physical control channel and the secondary dedicated physical control channel may alternatively be referred to as dedicated physical control channel (DPCCH) and secondary dedicated physical control channel (S-DPCCH). It is further assumed that the transmit power associated with the P-DPCCH is $P_{P\text{-}DPCCH}$ and the transmit power associated with the S-DPCCH is $P_{S\text{-}DPCCH} = \delta \cdot P_{P\text{-}DPCCH}$, where $\delta$ is a relative power difference between P-DPCCH and S-DPCCH. We furthermore let $$H = \begin{bmatrix} h11 & h12 \\ h21 & h22 \end{bmatrix} \quad \text{(Eq. 1)}$$

denote the channel matrix of the wireless channel between the UE 13 and the network node 12. Here h12 denotes the wireless channel between a second transmit antenna 24 of the UE 13 and a first receive antenna 25 of the network node 12. We also let $$\Omega = \begin{bmatrix} \kappa & 0 \\ 0 & \eta \end{bmatrix} \quad \text{(Eq. 2)}$$

be a matrix summarizing inaccuracies of power amplifiers (PAs) associated with the different physical antennas 13, 14. Note that $\kappa$ is a random variable that describes the inaccuracy associated with the first (upper) transmit branch, while $\eta$ is a random variable describing the inaccuracy of the PA associated with the second (lower) transmit branch illustrated in FIG. 2. Finally, we also let $$W = \begin{bmatrix} w1 & w3 \\ w2 & w4 \end{bmatrix} \quad \text{(Eq. 3)}$$

represent a pre-coding matrix. Here [w1 w2] are the pre-coding weights applied to the P-DPCCH and other signals associated with the first stream 21 and [w3 w4] are the pre-coding weights applied to the S-DPCCH and other signals associated with the second stream 22. With these notations, a received signal $r=[r_1\ r_2]$ at the NodeB 12 can be written as $$r = H \cdot \Omega \cdot W \cdot \text{diag}([1\ \delta]) \cdot s \quad \text{(Eq. 4)}$$

where $s=[s1(t)\ s2(t)]^T$ are two pilot signals. W corresponds to the identity matrix in a case where the DPCCH pilots are not pre-coded, as illustrated in FIG. 4 described below.

Figures 3, 4:
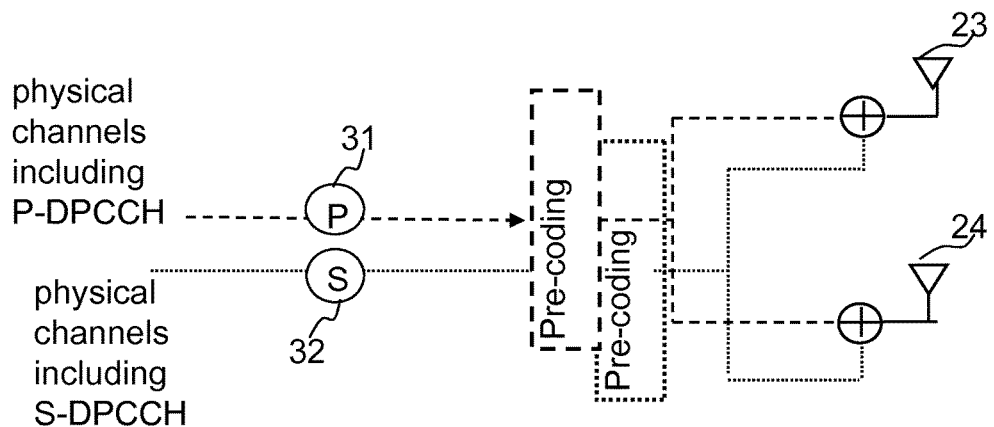
FIG. 3 is a schematic block diagram illustrating an embodiment of a user equipment architecture which can support uplink MIMO.
FIG. 4 is a schematic block diagram illustrating an alternative embodiment of a user equipment architecture which can support uplink MIMO.

FIGS. 3 and 4 illustrate two possible architectures for a UE configured in uplink MIMO mode comprising two physical antennas 23 and 24 and configured to use two streams for uplink MIMO transmissions. For uplink MIMO transmissions, a UE can transmit two of certain physical channels; one for each stream. For demodulation and channel sounding purposes at least one DPCCH pilot needs to be transmitted for each stream. In FIG. 3 the primary DPCCH (P-DPCCH) pilot and the secondary DPCCH (S-DPCCH) pilot are pre-coded with the same pre-coding vectors as used for pre-coding the other physical channels transmitted for each stream. The P-DPCCH is associated with a stream 31 and the S-DPCCH is associated with a stream 32. In FIG. 4 the P-DPCCH and S-DPCCH are not pre-coded and are associated with streams 41 and 42 respectively.

As mentioned above, an issue in case of uplink MIMO is how to ensure that the radio link quality associated with all virtual antennas can be controlled. One solution would be to introduce additional ILPCs and OLPCs so that each virtual antenna (i.e. stream) has its individual ILPC and OLPC. However, this solution presents several drawbacks and problems. For instance the signaling load on the serving RNC (S-RNC) will increase due to that the S-RNC needs control two or more OLPCs. Another drawback is that additional Fractional Dedicated Physical Channel (F-DPCH) resources need to be allocated to UEs configured in MIMO mode since each ILPC will require F-DPCH resources. Yet another drawback is that channel estimation for the purpose of channel sounding will become increasingly difficult. The latter is because the NodeB(s) need to be aware of the relative power difference $\delta$ between the DPCCH pilots in order to estimate the channel as can be seen from equation Eq. 4 above. The channel estimation is in turn necessary for performing the channel sounding in which suitable pre-coding vectors and the number of streams that should be scheduled is determined.

Apart from increasing downlink overhead, an architecture relying on multiple ILPC and OLPC loops thus require that the relative power difference between the DPCCHs are signaled by the UE. In soft handover the UE will receive TPC commands from both the serving and non-serving NodeB. Hence it is not possible for a single NodeB to keep track of the power difference between the P-DPCCH and the S-DPCCH by monitoring the TPC that it transmitted to the UE in soft handover. Furthermore since only the F-DPCH from the serving NodeB is power controlled by the UE, the non-serving NodeB cannot accurately estimate the pilot power difference. In addition, due to the large dynamic that can be expected in terms of DPCCH transmission power, in case similar SIR targets are used for all streams, several bits would have to be allocated on one existing uplink control channel to signal this relative power difference. To avoid such redesigns a solution relying on one ILPC and one OLPC may be desirable.

To ensure that the serving and any non-serving NodeB are aware of the power difference $\delta$, it can be either signaled by the UE 13 or kept constant. The latter could be achieved with a single ILPC that adjust the transmit power of both the P-DPCCH and the S-DPCCH.

This disclosure describes methods which allow the network to control the quality of data transmissions when the number of streams—also referred to as layers—transmitted by the UE exceeds the number of inner power control loops. In the following we will focus on a context where there only exists a single ILPC that controls the transmit power of both the P-DPCCH and the S-DPCCH. Different embodiments which are based on a single ILPC will now be described.

Some of the described embodiments relate to the NodeB and some embodiments relate to the UE.

Some embodiments relate to a method in a NodeB configured for controlling transmission power of a user equipment supporting uplink MIMO transmissions. Consequently the user equipment transmits multiple pilot signals as described above. The NodeB controls transmission power of the pilot signals by using a single ILPC operating on one or several of the pilot signals. The ILPC involves generating transmit power control (TPC) commands. Quality of one or several of the pilot signals and a quality target are considered when generating the TPC commands. The Node B transmits the TPC commands to the user equipment to adjust the transmission power of the pilot signal(s) on which the ILPC operates so that the quality of the adjusted pilot signal(s) meets the quality target.

Three exemplary main embodiments of the method in the NodeB are:

1) A method in the Node-B which considers the quality of both the P-DPCCH and the S-DPCCH simultaneously when generating the ILPC TPC commands.
2) A method in the Node-B which considers the quality of either the P-DPCCH or the S-DPCCH when generating the ILPC TPC commands. The OLPC may however operate on the packets transmitted on both the stream associated with the P-DPCCH—the so-called primary stream—and the stream associated with the S-DPCCH—the so-called secondary stream.
3) A method in the Node-B and the UE where the Node-B only considers the quality associated with one of the pilots (DPCCHs) and where the OLPC only is adjusted based on the data transmission quality observed for the stream that is power controlled. Transmission power and quality of the stream associated with the DPCCH which is not power controlled is controlled by adjusting a power offset used to determine the number of bits that can be transmitted on the beam that is not power controlled in a given subframe.

Figure 5A:
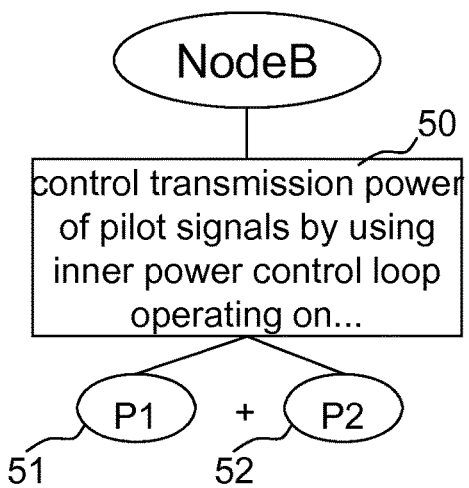
FIGS. 5a and 5b are flow diagrams illustrating alternative embodiments of methods of this disclosure which are performed in a NodeB.
Figure 5B:
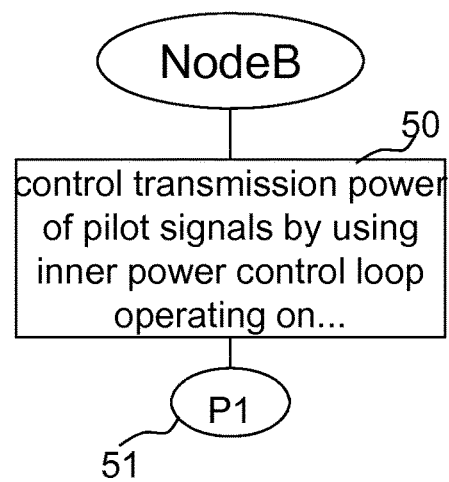

FIGS. 5a and 5b are flow diagrams corresponding to the three main embodiments described above. A first pilot signal and a second pilot signal are schematically illustrated and denoted with reference numeral 51 and 52 respectively. A step 50 of controlling transmission power of pilot signals using an ILPC is illustrated in FIGS. 5a and 5b. In FIG. 5a it is schematically illustrated that the ILPC operates on both the first pilot signal (P1) 51 and the second pilot signal (P2) 52, which corresponds to the first main embodiment described above. FIG. 5b schematically illustrates that the ILPC operates on a single pilot signal only, in the illustrated example on the first pilot signal (P1) 51. FIG. 5b corresponds to both the second and the third main embodiments described above.

More detailed examples corresponding to the above mentioned three main embodiments will now be discussed.

In the first main embodiment, the ILPC considers the quality of the P-DPCCH and the S-DPCCH simultaneously when generating TPC commands as mentioned above and as illustrated in FIG. 5a. Let $P_{RX,P\text{-}DPCCH}$ and $P_{RX,S\text{-}DPCCH}$ represent the received power associated with the primary and secondary DPCCH and $\Gamma_{target}$ represent the desired quality target used by the ILPC and adjusted by the OLPC. Let furthermore $f(P_{RX,P\text{-}DPCCH}, \ldots)$ represent a function that maps the received DPCCH pilot power, as well as other estimated or known parameters, into a quality metric. One example of such a mapping would be to compute the signal to interference ratio, i.e. $\gamma_{P\text{-}DPCCH} = P_{RX\text{-}P\text{-}DPCCH}/I$, where I is the estimated interference level (plus noise) associated with the primary stream. Then a TPC UP command is generated by the Node-B if $$G\{f(P_{RX,P\text{-}DPCCH}, \ldots), f(P_{RX,S\text{-}DPCCH}, \ldots)\} < \Gamma_{target} \qquad (\text{Eq. 5})$$

and a TPC DOWN command is generated otherwise. Here G is some general function and a typical example would be that the function G corresponds to the min-operator. There are however other functions that could be used to ensure that the quality of both DPCCHs meet the quality target $\Gamma_{target}$. Upon receiving a TPC command the UE updates the transmit power of both the P-DPCCH and the S-DPCCH in accordance with the TPC command. This ensures that the relative transmit power difference between the P-DPCCH and the S-DPCCH is constant and that the signal quality of both the P-DPCCH and the S-DPCCH meet the quality level $\Gamma_{target}$.

Figure 6A:
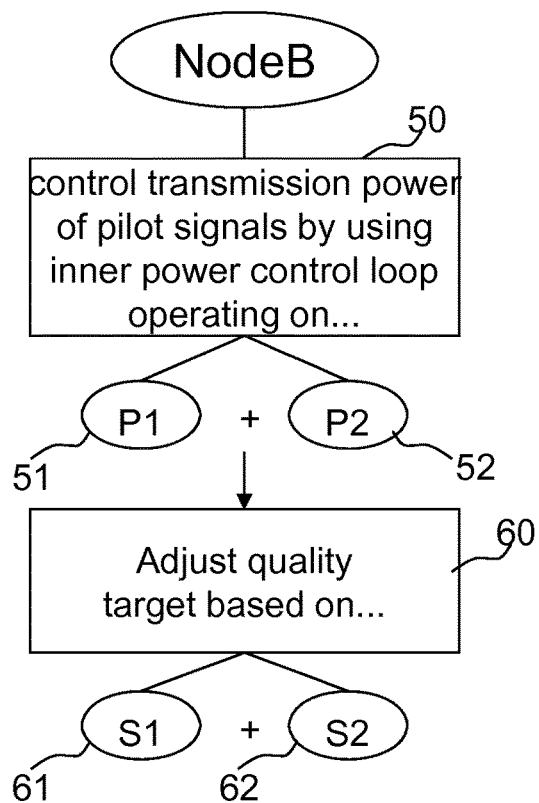
FIGS. 6a, 6b and 6c are flow diagrams illustrating further alternative embodiments of methods of this disclosure which are performed in a NodeB.

The OLPC quality target $\Gamma_{target}$ is then adjusted by the serving radio network controller (S-RNC) based on error statistics (e.g. number of transmission attempts) associated with the transport blocks transmitted. Here packets on different streams can be treated individually. FIG. 6a illustrates a corresponding embodiment of a method in the NodeB, comprising the step 50, where the ILPC operates on the first pilot signal 51 and the second pilot signal 52 as described above with reference to FIG. 5a. The method illustrated in FIG. 6a also comprises a step 60 of the OLPC adjusting the quality target used by the ILPC based on error statistics. It is schematically illustrated in FIG. 6a that error statistics of both a first stream (S1) 61 and a second stream (S2) 62 are considered when adjusting the quality target according to this embodiment. The first stream (S1) 61 is the stream associated with the first pilot signal (P1) 51 and the second stream (S2) 62 is the stream associated with the second pilot signal (P2) 52.

By using a scheme, according to the first main embodiment, which ensures that quality of the worst DPCCH pilot meets the quality target, it will result in that excessive transmit power is used for the best stream. For example, if the SIR associated with the P-DPCCH is x dB higher than the SIR associated with S-DPCCH this means that a fraction $10^{x/10}$ of the noise rise budget available to the primary stream is wasted. Hence, this method will result in an additional overhead level. An alternative way to view this is that the best stream relies on an unnecessarily high SIR target.

In the second main embodiment the ILPC only considers signal quality of the DPCCH pilot associated with one of the two streams. The DPCCH pilot power associated with the other stream, which is not power controlled, is transmitted at a power such that the relative power difference between the two DPCCHs is fixed. Although one in principle could base the ILPC on either the primary or the secondary stream, the most natural design choice would be to consider the P-DPCCH. Using the latter as an example a TPC UP command is generated if $$f(P_{RX,P\text{-}DPCCH}, \ldots) < \Gamma_{target} \qquad (\text{Eq. 6})$$

and a TPC DOWN command is generated otherwise. With this scheme the ILPC would ensure that the quality level of the primary stream is met. The quality level of the second stream would however not be considered by the ILPC.

Figures 6B, 6C:
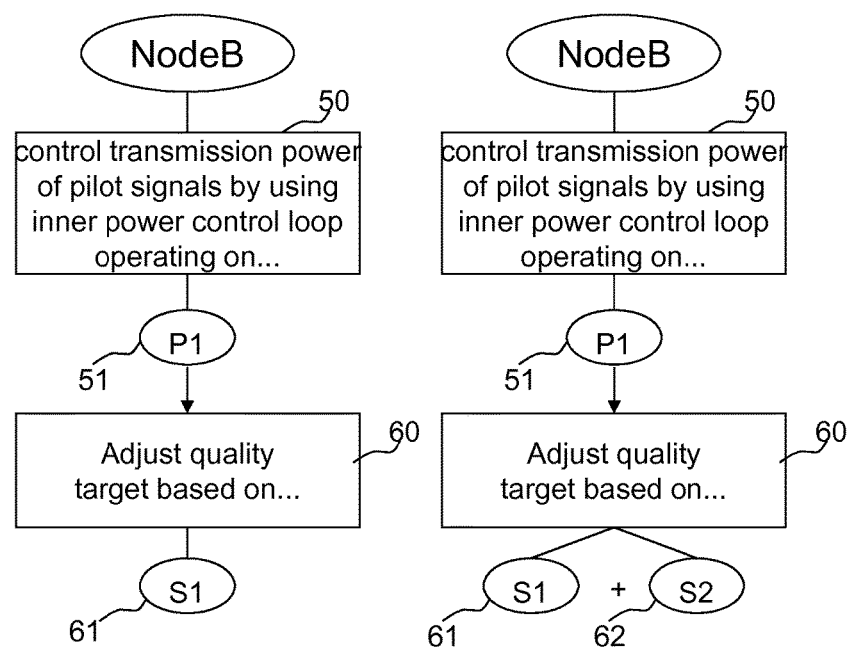

One example method corresponding to the second main embodiment is illustrated in FIG. 6b. According to this example the OLPC only considers the transport blocks transmitted over the power-controlled primary beam. This is illustrated in FIG. 6b by the step 50 operating on the first pilot 51 and the step 60 operating on the first stream 61 (which in this example is assumed to be the primary stream). Thus, according to the example illustrated in FIG. 6b, transmission power of the pilot signals is controlled by means of the ILPC operating on the first pilot 51 only in the step 50 and the ILPC quality target is controlled by the OLPC based on error statistics associated with the first stream 61 according to the step 60. Note that some solutions may be reused by the NodeB to signal to the RNC that it should not consider packets from the second stream when adjusting the OLPC, cf. SIR target freeze. With this approach the quality level for the stream that is not taken in account by the ILPC will be uncontrollable, in this example the second stream. This will result in unpredictable and highly varying error statistics for the transport blocks transmitted on this stream. Aside from increasing layer 1 (L1) retransmissions this will also increase the probability for radio link control (RLC) retransmissions and RLC window stalling.

An alternative example method corresponding to the second main embodiment is illustrated in FIG. 6c. According to this example the OLPC is based on error statistics associated with both streams. This is illustrated in FIG. 6c by the step 50 operating on the first pilot 51 and the step 60 operating on both the first stream 61 and the second stream 62. Thus, according to the example illustrated in FIG. 6c, transmission power of the pilot signals 51, 52 is controlled by means of the ILPC operating on the first pilot 51 only in the step 50 and the ILPC quality target is controlled by the OLPC based on error statistics associated with both the first stream 61 and the second stream 62 according to the step 60. This approach will result in that the OLPC increases the quality target $\Gamma_{target}$ so that a sufficient quality level is maintained also for the stream that is not power controlled by the ILPC. Similarly to the method described above corresponding to the first main embodiment, this will result in that an increased overhead is introduced. It should however be noted that the OLPC is considerably slower than the ILPC since the OLPC requires communication with the RNC. Therefore, power and quality control of the second stream 62, which is not power controlled by the ILPC will be considerably slower than the power and quality control of the first stream 61 controlled by the ILPC. Therefore it may be appropriate to map physical channels which are considered to be most important to the stream that is power controlled by the ILPC. Thus a High-Speed Dedicated Physical Control Channel, HS-DPCCH, and/or non-scheduled transmissions from the user equipment may be mapped to the first stream 61. Given that mapping of the most important channels, HS-DPCCH and/or non-scheduled transmissions, is well-defined and always mapped to one of the streams, the example method illustrated in FIG. 6b could be used to ensure that the quality of this data is sufficient.

As mentioned above, in the third main embodiment the ILPC only operates on one of the two streams. In the following we will use the primary stream as an example and thus assume that the ILPC power controls the P-DPCCH. However, it is also possible to instead let the ILPC operate on the S-DPCCH. Also according to the third main embodiment, the OLPC only operates on the stream that is power controlled by the ILPC which corresponds to the method steps illustrated in FIG. 6b. However, to control the quality level of the data transmissions associated with the stream that is not power controlled the UE dynamically adjust which E-TFC that should be used, given a certain serving grant, based on feedback transmitted from the network. More specifically, let $SG_2$ denote the grant associated with the secondary stream. This grant can either be signaled explicitly from the network or be derived by the network from a grant SG that needs to be shared between both streams. Then, the total power available for data transmissions on the second stream is given as $$P_2 = SG_2 P_{S\text{-}DPCCH} = (SG_2/\delta) P_{P\text{-}DPCCH} \quad \text{(Eq. 7)}$$

where $P_{P\text{-}DPCCH}$ is the transmit power of the P-DPCCH, $P_{S\text{-}DPCCH}$ is the transmit power of the S-DPCCH, and $\delta$ is the signal power offset between the P-DPCCH and the S-DPCCH. Based on the power available $P_2$, the UE can compute the corresponding number of bits as if the extrapolation formula is used given that DPCCH quality was met $$K_{e,ref,m} \cdot \frac{SG_2 \cdot \Delta_{SG}}{L_{e,ref,m} \cdot A_{ed,m}^2 \cdot 10^{\Delta harq}} \quad \text{(Eq. 8)}$$

where $\Delta_{SG}$ represents a power offset that is applied by the UE when it computes the number of bits that it can transmit in the given TTI. Note that $10^{\Delta harq}$ is here used to represent the HARQ power profile in linear scale. In Eq. 8, $$K_{e,ref,m} \cdot \frac{SG_2}{L_{e,ref,m} \cdot A_{ed,m}^2 \cdot 10^{\Delta harq}}$$

is the E-DPDCH power extrapolation formula specified in the 3GPP standard specification TS 25.321 V.9.0.0, section 11.8.1.4, for determining a maximum number of bits of scheduled data for an upcoming transmission using a reference E-TFC (E-TFC$_{ref,m}$). Note that when $\Delta_{SG}=1$ equation Eq. 8 simplifies to the legacy procedure for computing the number of bits that can be transmitted in the TTI. When $\Delta_{SG}<1$, fewer bits will be transmitted than what would be possible using the legacy E-DPDCH power extrapolation formula (i.e. ignoring $\Delta_{SG}$), which may help to keep block error rate (BLER) down if the quality of the second stream is poor. Note that it is straightforward to adapt the E-DPDCH power interpolation formula specified in the 3GPP standard specification TS 25.321 V.9.0.0 in a similar fashion as the E-DPDCH extrapolation formula was adapted above, i.e. the power offset $\Delta_{SG}$ can be introduced in the E-DPDCH power interpolation formula for computing the number of bits that can be transmitted in a TTI.

The variable $\Delta_{SG}$ may, according to some embodiments, be updated by the NodeB, e.g., in
  a closed loop fashion where the Node-B signals whether the $\Delta_{SG}$ should be increased, reduced, or keep the same value, or
  an open loop fashion where the Node-B explicitly signals the value of $\Delta_{SG}$ that the UE should employ.

To decide how to update the $\Delta_{SG}$ the Node-B could exploit:
  The measured quality of the P-DPCCH and the S-DPCCH. To exemplify, the difference of the measured signal power ($P_{RX,P\text{-}DPCCH}$ and $P_{RX,S\text{-}DPCCH}$) in dB $$P_{RX,P\text{-}DPCCH} - \delta - P_{RX,S\text{-}DPCCH} \quad \text{(Eq. 9)}$$

can be viewed as an estimate of how much higher/lower power offsets that the UE need to use for a certain E-TFC given that the same amount of power needs to be spent on the E-DPDCH.
  The error statistics associated with the transmissions of the stream that is not power controlled by the ILPC. For example, if number of transmissions required for a certain transport block exceeds a threshold, the $\Delta_{SG}$ could be increased. Similarly if $\Delta_{SG}$ is less than the threshold the power offset $\Delta_{SG}$ could be reduced.
  Measured received power of the physical channels such as E-DPCCH, E-DPDCH, DPCCH, etc.

The feedback information conveying $\Delta_{SG}$ could be signaled to the UE over a Fractional Dedicated Physical Channel (F-DPCH), an Enhanced Dedicated Channel Relative Grant Channel (E-RGCH) or an Enhanced Dedicated Channel Absolute Grant Channel (E-AGCH).

Note also that the power offset $\Delta_{SG}$ can be applied to either all or a subset of the physical HSUPA channels (E-DPCCH, E-DPDCH, and/or HS-DPCCH) transmitted on the stream that is not power controlled by the ILPC.

According to some alternative embodiments, the variable $\Delta_{SG}$ may be updated by the UE based on error statistics associated with the stream that is not power controlled by the ILPC. Such error statistics may be observed by the UE. The error statistics may e.g. be based on feedback information transmitted on a E-DCH Hybrid ARQ Indicator Channel (E-HICH) associated with the stream that is not power controlled by the ILPC.

Figure 7:
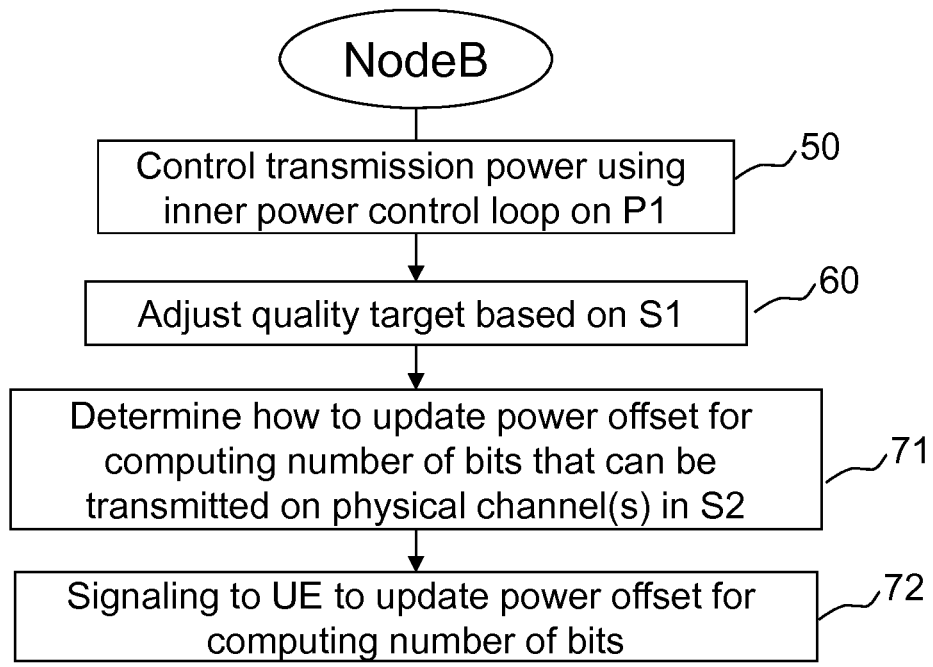
FIG. 7 is a flow diagram illustrating a further exemplary embodiment of a method which is performed in a NodeB.

FIG. 7 is a flow diagram illustrating an example method in a NodeB corresponding to the above described third main embodiment. The method comprises a step 50 of controlling transmission power of a UE configure for uplink MIMO by using an ILPC operating on a first pilot signal. The method further comprises a step 60 of adjusting a quality target used by the ILPC based on error statistics associated with a first stream associated with the first pilot signal, i.e. error statistics of any other stream which is not associated with the first pilot signal is not taken into account when adjusting the quality target of the ILPC. In a step 71, the NodeB determines how to update a power offset for computing number of bits that can be transmitted, in a given TTI, on physical channel(s) in a second stream which is not power controlled by the ILPC. In a step 72, the UE signals to the UE to update the power offset to be applied by the UE for computing the number of bits to transmit in a TTI.

Figure 8:
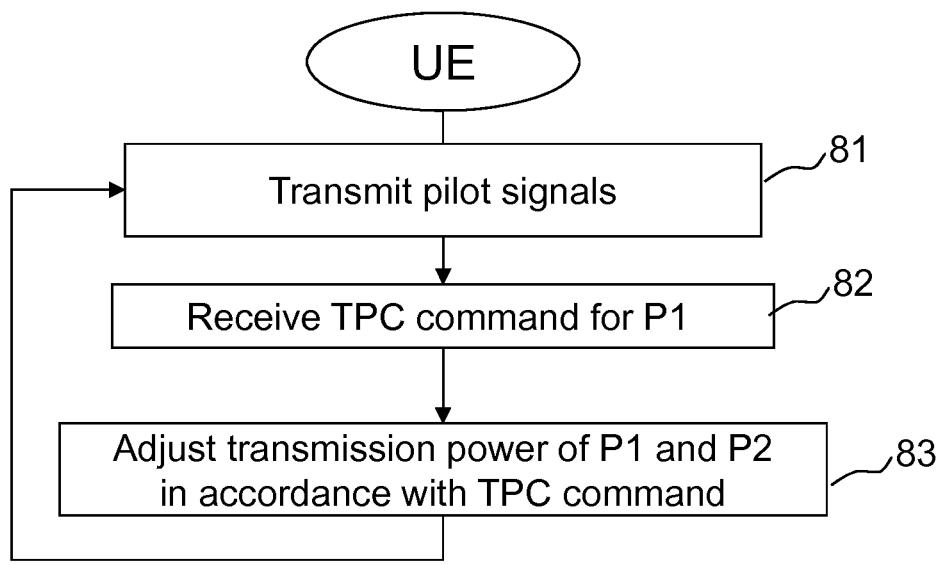
FIG. 8 is a flow diagram illustrating an exemplary embodiment of a method which is performed in a user equipment.

From the above description of exemplary methods in the NodeB, it can be understood that corresponding methods may be implemented in the UE. Some of these corresponding methods require a modified behavior of the UE compared to the behavior the UE would have in a scenario of single stream transmissions. FIG. 8 is a flow diagram illustrating a method in a UE configured for uplink MIMO. The method comprises a step 81 of transmitting multiple pilot signals and a step 82 of receiving TPC commands for adjusting the transmission power of a first pilot signal. The method further comprises a step 83 of adjusting the transmission power of the first pilot signal in accordance with the transmit power control commands while adjusting the transmission power of a second pilot signal so that a fixed power difference is maintained between the first pilot signal and the second pilot signal.

Figure 9:
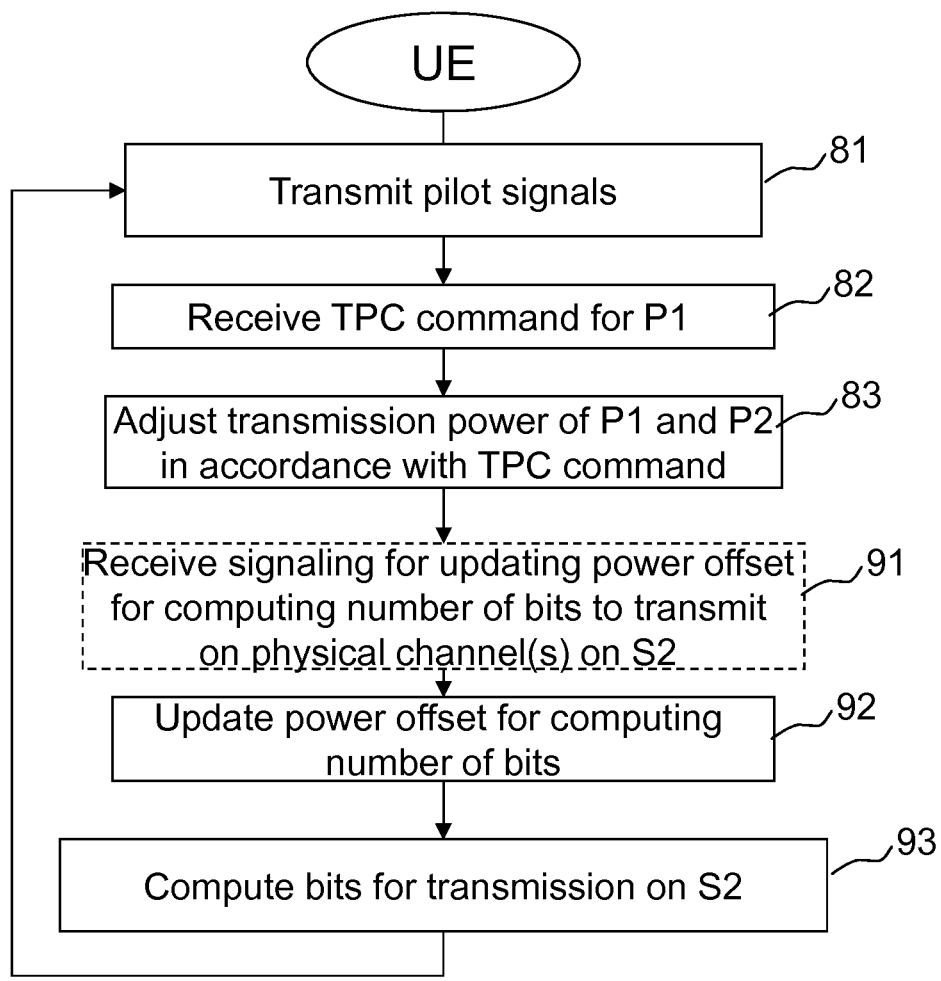
FIG. 9 is a flow diagram illustrating an exemplary alternative embodiment of a method which is performed in a user equipment.

FIG. 9 is a flow diagram illustrating an exemplary method in a UE which corresponds to an embodiment according to the third main embodiment described above. The method illustrated in FIG. 9 comprises steps 81-83 corresponding to steps 81-83 described in connection with FIG. 8. The method also comprises an optional step 91 of receiving, from the NodeB, signaling for updating a power offset to be applied by the user equipment when computing the number of bits that can be transmitted in a TTI on a physical channel transmitted on the second stream associated with the second pilot signal. In a step 92 the power offset is updated in accordance with the signaling received in the step 91.

Alternatively the UE may autonomously determine how to update the power offset for the bit computation in the step 92 based on error statistics associated with the second stream. Thus the step 91 is not required in cases where the UE autonomously determines how to update the power offset. The method of FIG. 9 also comprises an additional step 93 of computing the number of bits the user equipment can transmit on the second stream based on the updated power offset.

Figure 10:
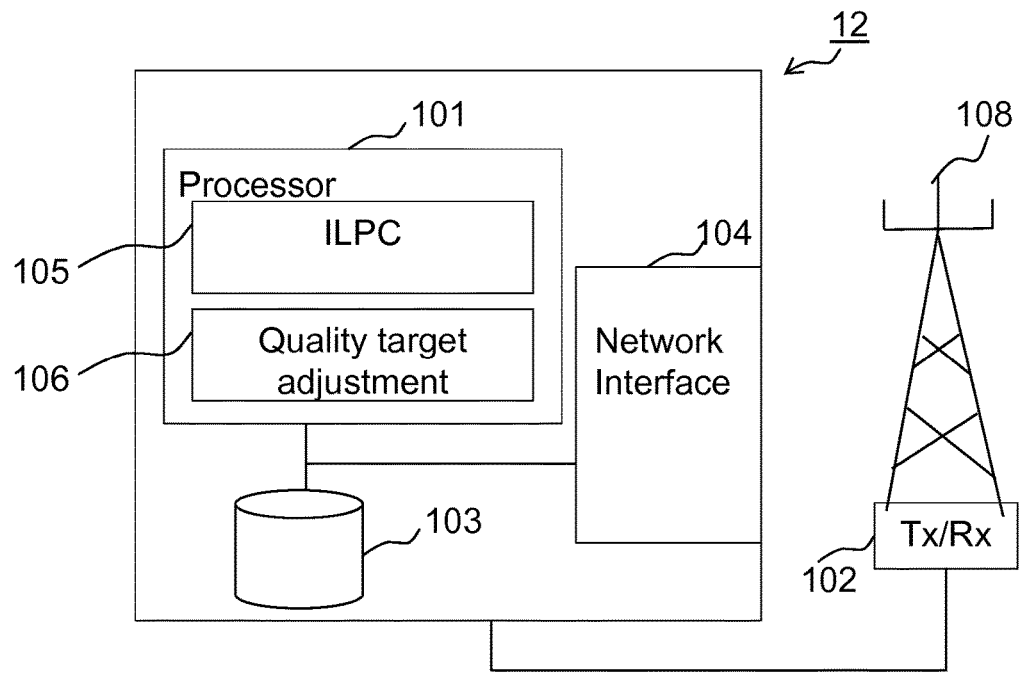
FIG. 10 is a schematic block diagram of a NodeB according to an embodiment of this disclosure.

FIG. 10 is a schematic block diagram of an exemplary embodiment of a base station 12, such as a NodeB, which may be configured to carry out the example methods illustrated in FIGS. 5-7. As illustrated in FIG. 10, the base station 12 includes a processor 101, a memory 103, a transceiver 102, a network interface 104 and an antenna 108. The antenna 108 may comprise multiple antenna elements configured for uplink and/or downlink MIMO. In particular embodiments, some or all of the functionality described above as being provided by a NodeB, may be provided by the base station processor 101 executing instructions stored on a computer-readable medium, such as the memory 103 shown in FIG. 10. Thus the processor 101 may be configured to execute instructions of different software modules, such as a software module 105 comprising program instructions for implementing the ILPC of the different embodiments described above, or a software module 106 comprising program instructions for interacting with a RNC, which implements the OLPC, to adjust the quality target of the ILPC according to the different embodiments described above. Alternative embodiments of the base station may include additional components responsible for providing additional functionality, including any of the functionality identified above and/or any functionality necessary to support the embodiments described above.

Figure 11:
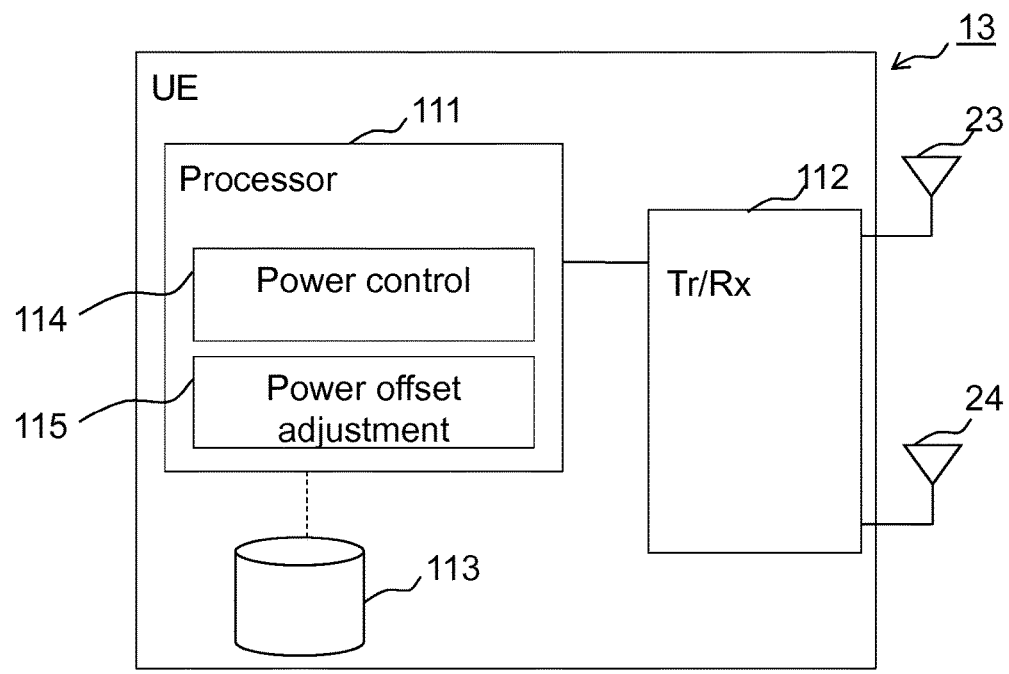
FIG. 11 is a schematic block diagram of a user equipment according to an embodiment of this disclosure.

FIG. 11 is a schematic block diagram of an exemplary embodiment of a UE 13, which may be configured to carry out the example methods illustrated in FIGS. 8 and 9. As shown in FIG. 11, the example UE 13 includes a processor 111, a memory 113, a transceiver 112, and antennas 23 and 24. The antennas 23 and 24 may be embodied as different antenna elements of a multi-element antenna. In particular embodiments, some or all of the functionality described above as being provided by a UE, may be provided by the UE processor 111 executing instructions stored on a computer-readable medium, such as the memory 113 shown in FIG. 11. Thus the processor 111 may be configured to execute instructions of different software modules, such as a software module 114 comprising program instructions for implementing UE functionality with respect to the power control based on received TPC commands according to the different embodiments described above, or a software module 115 comprising program instructions for implementing the power offset adjustment with respect to bit computation of the different embodiments described above. Alternative embodiments of the UE may include additional components beyond those shown in FIG. 11 that may be responsible for providing certain aspects of the UE's functionality, including any of the functionality described above and/or any functionality necessary to support the embodiments described above.

From the description above it is apparent that some of the embodiments of this disclosure enables improved network control of quality of the packet transmissions for uplink MIMO transmissions.

The embodiments of this disclosure are applicable to both single-cell and dual-cell WCDMA/HSUPA systems. Furthermore, although the embodiments are described in a context of a UE and a Node-B equipped with two transmit antennas/antenna elements and for the UE architectures described in FIGS. 2, 3 and 4, the disclosure is also applicable to settings with a larger number of transmit and receive antennas.

In the drawings and specification, there have been disclosed typical embodiments and, although specific terms are employed, they are used in a generic and descriptive sense only and not for purposes of limitation, the scope of the invention being set forth in the following claims.

What is claimed is:

1. A method in a user equipment configured for uplink Multiple-Input Multiple-Output (MIMO) transmissions, the method comprising:
   transmitting multiple pilot signals, including a first pilot signal associated with a first MIMO stream and a second pilot signal associated with a second MIMO stream;
   receiving, from a NodeB, transmit power control commands for adjusting the transmission power of the first pilot signal;
   adjusting the transmission power of said first pilot signal in accordance with said transmit power control commands;
   receiving, from the NodeB, signaling for updating a power offset to be applied by the user equipment when computing the number of bits that can be transmitted in a transmission time interval (TTI) on at least one physical channel transmitted on the second MIMO stream associated with the second pilot signal;
   updating said power offset in accordance with said received signaling;
   computing the number of bits the user equipment can transmit on said second MIMO stream in the TTI, based on said power offset; and
   transmitting on said second MIMO stream in the TTI according to the computed number of bits.

2. The method of claim 1, wherein said received signaling comprises a value of said power offset.

3. The method of claim 1, wherein said received signaling comprises information indicating whether a value of said power offset is to be increased, reduced or maintained.

4. A user equipment configured for uplink Multiple-Input Multiple-Output (MIMO) transmissions, the user equipment comprising a transceiver and a processor,
   wherein the transceiver is configured to:
      transmit multiple pilot signals, including a first pilot signal associated with a first MIMO stream and a second pilot signal associated with a second MIMO stream; and
      receive, from a NodeB, transmit power control commands for adjusting the transmission power of the first pilot signal;
      receive, from the NodeB, signaling for updating a power offset to be applied by the user equipment when computing the number of bits that can be transmitted in a transmission time interval (TTI) on at least one physical channel transmitted on the second MIMO stream associated with the second pilot signal; and
   wherein the processor is configured to:
      adjust the transmission power of said first pilot signal in accordance with said transmit power control commands;
      update said power offset in accordance with said received signaling; and compute the number of bits the user equipment can transmit on said second MIMO stream in the TTI, based on said power offset; and wherein the transceiver is further configured to:
    transmit on said second MIMO stream, in the TTI, according to the computed number of bits.

5. A method in a user equipment configured for uplink Multiple-Input Multiple-Output (MIMO) transmissions, the method comprising:
- transmitting multiple pilot signals, including a first pilot signal associated with a first MIMO stream and a second pilot signal associated with a second MIMO stream;
- receiving, from a NodeB, transmit power control commands for adjusting the transmission power of the first pilot signal;
- adjusting the transmission power of said first pilot signal in accordance with said transmit power control commands;
- updating a power offset to be applied by the user equipment when computing the number of bits that can be transmitted in a transmission time interval (TTI) on at least one physical channel transmitted on the second MIMO stream associated with said second pilot signal, wherein said power offset is updated based on error statistics associated with said second MIMO stream;
- computing the number of bits the user equipment can transmit on said second MIMO stream in the TTI, based on said power offset; and
- transmitting on said second MIMO stream in the TTI according to the computed number of bits.

6. The method of claim 5, wherein said error statistics associated with said second MIMO stream are based on feedback information transmitted on a E-DCH Hybrid ARQ Indicator Channel (E-HICH) associated with said second MIMO stream.

7. A user equipment configured for uplink Multiple-Input Multiple-Output (MIMO) transmissions, the user equipment comprising a transceiver and a processor, wherein the transceiver is configured to:
- transmit multiple pilot signals, including a first pilot signal associated with a first MIMO stream and a second pilot signal associated with a second MIMO stream; and
- receive, from a NodeB, transmit power control commands for adjusting the transmission power of the first pilot signal; and wherein the processor is configured to:
- adjust the transmission power of said first pilot signal in accordance with said transmit power control commands;
- update a power offset to be applied by the user equipment when computing the number of bits that can be transmitted in a transmission time interval (TTI) on at least one physical channel transmitted on the second MIMO stream associated with said second pilot signal, based on error statistics associated with said second MIMO stream; and
- compute the number of bits the user equipment can transmit on said second MIMO stream based on said power offset; and wherein the transceiver is further configured to:
    transmit on said second MIMO stream in the TTI according to the computed number of bits.

8. The method of claim 7, wherein said error statistics associated with said second MIMO stream are based on feedback information transmitted on a E-DCH Hybrid ARQ Indicator Channel (E-HICH) associated with said second MIMO stream.

* * * * *